R. P. BEAUCHEMIN.
VEHICLE WHEEL ATTACHMENT.
APPLICATION FILED APR. 11, 1914.
1,118,914.
Patented Dec. 1, 1914.
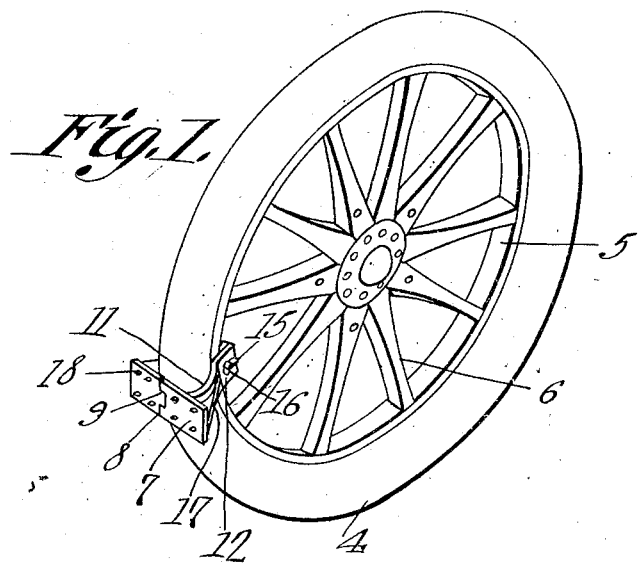
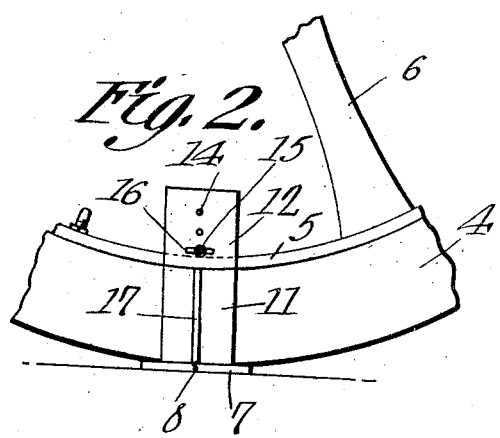
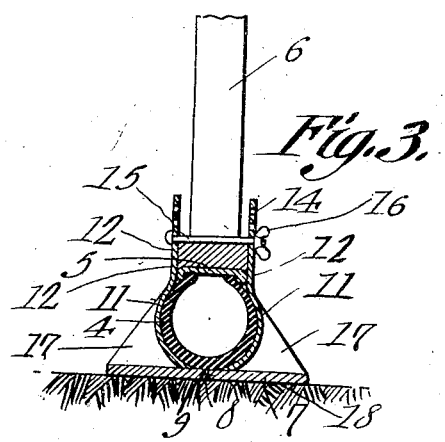
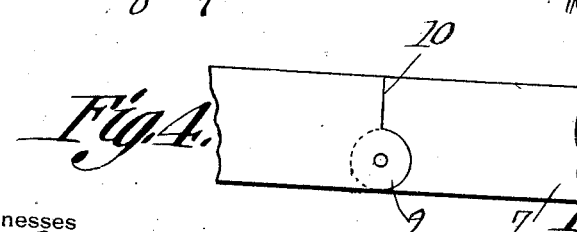
Witnesses
R. P. Beauchemin
Inventor
by
Attorneys

UNITED STATES PATENT OFFICE.

RICHARD P. BEAUCHEMIN, OF JEFFERSON, SOUTH DAKOTA.

VEHICLE WHEEL ATTACHMENT.

1,118,914. Specification of Letters Patent. Patented Dec. 1, 1914.

Application filed April 11, 1914. Serial No. 831,222.

*To all whom it may concern:*

Be it known that I, RICHARD P. BEAUCHEMIN, a citizen of the United States, residing at Jefferson, in the county of Union and State of South Dakota, have invented a new and useful Vehicle Wheel Attachment, of which the following is a specification.

This invention relates to improvements in vehicle wheel attachments and more particularly to a detachable shoe for automobiles which may be secured to the rim and tire of a vehicle wheel in order to aid the same in propelling itself when embedded in soft earth, mud, snow and the like.

A further object is to provide a detachable shoe which may be easily and quickly secured to a vehicle wheel, and will present a broad and flat surface in both radial and tangential planes, the radial exposure providing for the necessary traction for the forward propagation of the vehicle and the tangentially disposed surface rendering the requisite supporting area available.

A further object is to provide a device which will tightly clamp the tire and thus be rigidly held in place. The device as thus characterized is of simple construction, cheap to manufacture, and due to its light weight and small size may be conveniently carried in the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a view in perspective of a vehicle wheel with my improved attachment secured thereto, it being noted, that only one of the attachments is disclosed upon the present wheel but a number may be used clearly within the scope of the invention. Fig. 2 is an enlarged fragmental view of the wheel disclosing my attachment in side elevation, secured thereto. Fig. 3 is a sectional view taken on a line extending vertically through the center of the device as illustrated in Fig. 2. Fig. 4 is a detail view of the hinge joint.

Referring to the drawings in which similar reference numerals designate corresponding parts throughout the several views, 4 represents a vehicle tire securely attached to the rim 5, the latter being supported by the usual spokes 6.

The attachment which may be well termed a detachable shoe or lifting device for automobiles, includes the base plate 7 which is parted along the transverse median line 8, the two parts being hingedly secured together by the interlocking tongues 9. In this connection it is to be noted that the two parts of the base plate may rotate into alinement as disclosed in Fig. 1 or may move outwardly and downwardly therefrom, thus allowing the parts to separate for the detachment of the device but suitable means in the form of lugs 10 are provided, preventing the counter-rotation of the two parts of the base plate beyond the position illustrated in the drawings. Thus, when the device is attached, assurance will be had that a broad flat surface will be provided, thus rendering available the requisite or necessary supporting area which is of prime importance when the earth is soft.

Projecting upwardly from the meeting or adjacent terminals of the two parts of the base plate 7 are the clamping plates 11, the said clamping plates conforming to the contour of the tire and thus adapted to have superficial contact therewith, the said clamping plates projecting beyond the inner peripheral edge of the tire as at 12 and thus forming upstanding arms which are provided with a plurality of alined openings 14 extending therethrough. A suitable tie bolt 15 extends through the said openings and rigidly clamps the upstanding arms together by the wing nut 16. Thus the clamping bolt and wing nut are adapted to draw the clamping plates and upstanding arms into rigid and forced contact with the side walls of the tire and the rim 5. It is to be noted that friction alone may not be depended upon to hold the shoe in place but this may be accomplished by allowing the device to slide until the clamping bolt contacts with one of the spokes after which further sliding movement of the device will be rendered impossible.

In order to strengthen the entire device, and at the same time provide a surface extending radially of the wheel and at the same time transversely thereof and to obtain the proper and requisite amount of purchase upon the ground for the production of the necessary tractive effort, the flanges or plates 17 are provided, they being formed integral with the base plate 7 and clamping plates 11. The said reinforcing plates or wings are substantially triangular in outline and thus materially strengthen the entire device. The device herein disclosed may be used with tires of different dimensions, the plurality of bolt-holes 14 being provided for such contingencies.

In order that the device may be used with facility upon wheels during the winter and when encountering ice, the four calks 18 or allied projections are provided.

Having thus fully described the invention, what I claim to be new and original with me is:—

1. A device of the class described, comprising hingedly mounted base plates limited for rotation in one direction, upstanding clamping plates carried by the said base plates and adapted to embrace a vehicle tire therebetween, means engaging the said clamping plates adapted to draw the same into forced contact with the said vehicle tire, and reinforcing wings extending between the said base plates and clamping plates adapted to reinforce the same and providing radial and transversely extending wings.

2. A detachable shoe for vehicle wheels comprising a two part hingedly connected base plate, means for limiting the rotation of the parts of base plate in one direction to coplanarity, upstanding clamping plates carried by the base plate and conforming to the outer contour of a vehicle tire, means for drawing the said clamping plates into forced contact with the said tire, and wings extending between the said clamping plates and base plates and affording a transversely extending area adapted to exert a tractive effort upon the ground.

In testimony that I claim the foregoing as my own, I have hereto affixed my signature in the presence of two witnesses.

RICHARD P. BEAUCHEMIN.

Witnesses:
　ALPHONSE LA BRICHE,
　GEORGE ALLARD.